United States Patent [19]

Ogawa et al.

[11] Patent Number: 4,812,699
[45] Date of Patent: Mar. 14, 1989

[54] DRIVE CONTROL DEVICE IN AN ULTRASONIC VIBRATION MOTOR

[75] Inventors: Hidehiro Ogawa; Kazuyuki Kazami, both of Tokyo, Japan

[73] Assignee: Nikon Corporation, Tokyo, Japan

[21] Appl. No.: 117,328

[22] Filed: Nov. 6, 1987

[30] Foreign Application Priority Data

Nov. 11, 1986 [JP] Japan .................................. 61-268275
Feb. 19, 1987 [JP] Japan .................................. 62-36175
Feb. 19, 1987 [JP] Japan .................................. 62-36176

[51] Int. Cl.$^4$ ............................................ H01L 41/08
[52] U.S. Cl. ...................................... 310/316; 318/116
[58] Field of Search ................ 310/316, 317, 323, 328; 318/116, 118

[56] References Cited

U.S. PATENT DOCUMENTS

| | | | |
|---|---|---|---|
| 4,275,363 | 6/1981 | Mishiro et al. | 310/316 X |
| 4,277,758 | 7/1981 | Mishiro | 310/316 X |
| 4,510,411 | 4/1985 | Hakamata et al. | 310/328 X |
| 4,513,219 | 4/1985 | Katsuma et al. | 310/328 |
| 4,551,690 | 11/1985 | Quist | 310/316 X |
| 4,560,263 | 12/1985 | Katsuma et al. | 310/323 X |
| 4,562,374 | 4/1985 | Sashida | 310/328 |
| 4,626,728 | 12/1986 | Flachenecker et al. | 310/316 |
| 4,658,172 | 4/1987 | Izukawa | 310/316 |
| 4,692,649 | 9/1987 | Izukawa et al. | 310/316 |
| 4,713,571 | 12/1987 | Suzuki et al. | 310/323 X |

*Primary Examiner*—Mark O. Budd
*Attorney, Agent, or Firm*—Shapiro and Shapiro

[57] ABSTRACT

A ultrasonic vibration motor comprises a moving member, a vibration member contacted by the moving member, an electrostrictive device provided on the vibration member, a power supply for applying a periodic voltage to the electrostrictive device to thereby vibrate the electrostrictive device and generate a travelling vibration wave in the surface of the vibration member, a device for detecting the phase difference between the voltage applied to the electrostrictive device and the current flowing into the electrostrictive device, and a device for discriminating a variation in the load of the moving member on the basis of the phase difference.

8 Claims, 5 Drawing Sheets

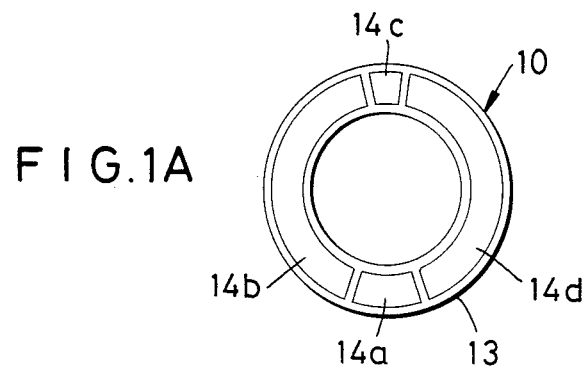
FIG.1A
FIG.1B
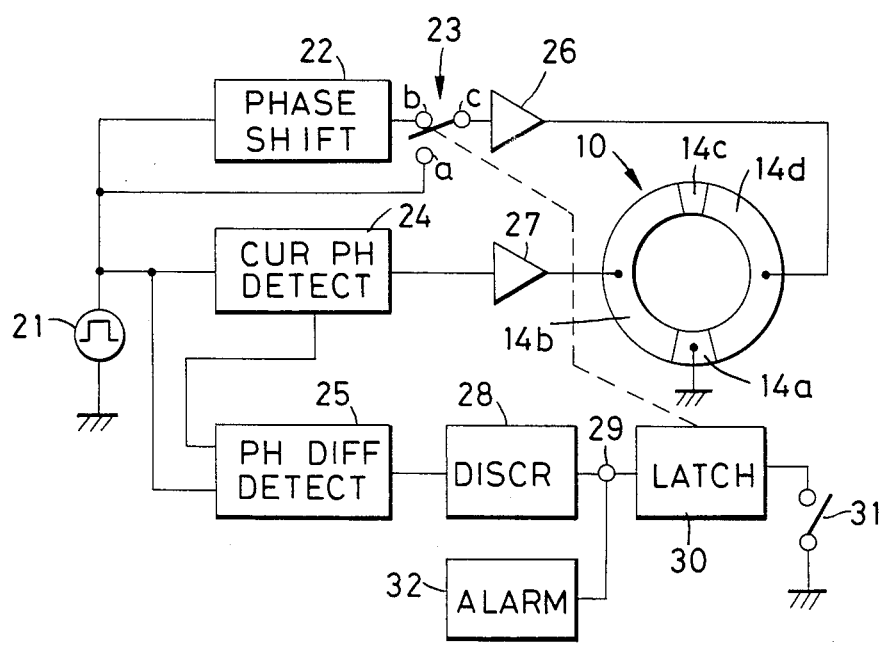
FIG.2

F I G. 5
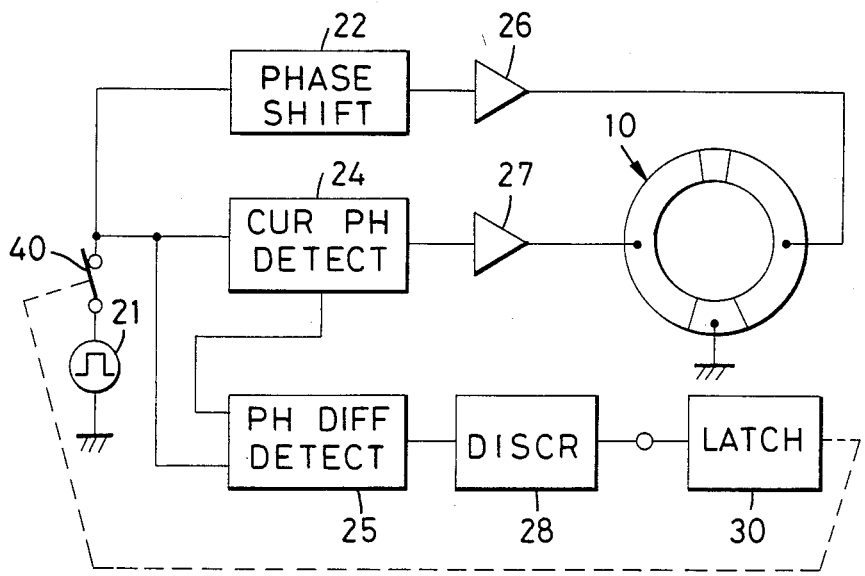
F I G. 6
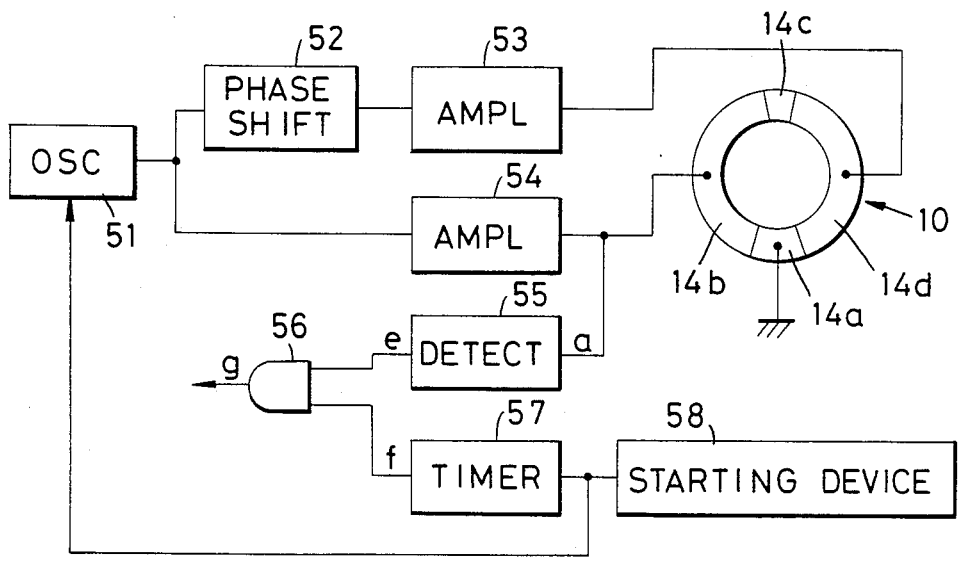

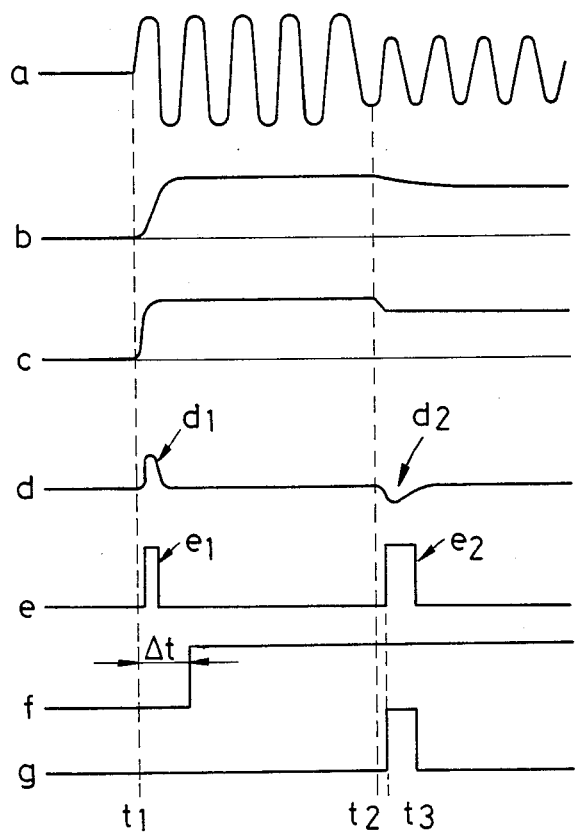
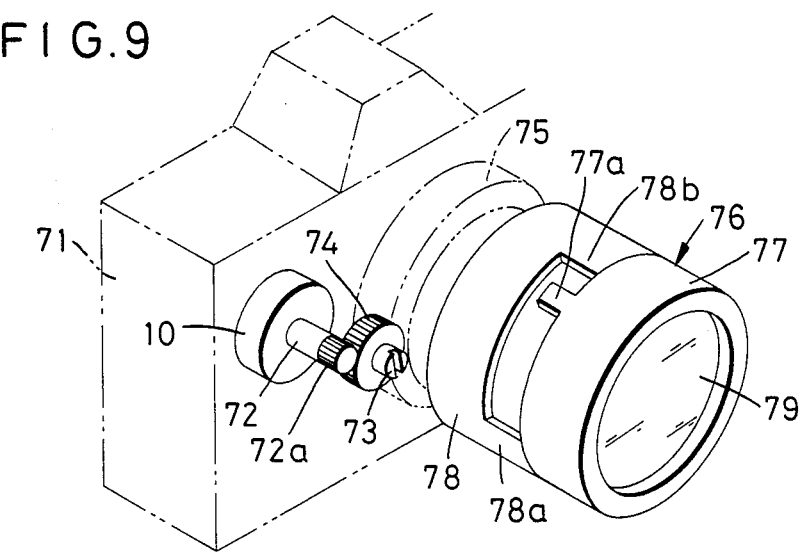

DRIVE CONTROL DEVICE IN AN ULTRASONIC VIBRATION MOTOR

BACKGROUND OF THE INVENTION

1. Field of the Invention

This invention relates to a drive control device in a vibration wave motor utilizing ultrasonic vibration.

2. Related Background Art

Ultrasonic vibration motors are already known, for example, from U.S. Pat. Nos. 4,510,411 and 4,562,374.

Vibration motors of this type are such that for example, an AC signal is supplied to an electrostrictive device to vibrate it, thereby forming a travelling vibration wave in the surface of a resilient member and driving a moving member. At this time, the moving member is in contact with the resilient member with a predetermined pressure force and thus, when the load of the moving member becomes great, relative displacement based on the travelling vibration wave occurs between the surfaces of contact of the two members Accordingly, to prevent the abrasion of the two members and improve their lives, it is preferable to stop the motor when the load of the moving member is great. There is also a requirement that when the moving member is locked, it should be detected to reverse the motor.

So, it is conceivable to provide a sensor such as a rotary encoder on the moving member side and detect from the movement of the moving member that a great load is acting, to thereby stop the vibration wave motor, or to provide a switch adapted to be closed in a predetermined rotation angle position of the moving member and stop or reverse the motor by the closing of this switch, but this is not preferable in that a sensor or a switch discrete from the motor components is necessary, which in turn leads to a complicated construction. It is not possible to detect an overcurrent and detect the motor load as in the conventional DC motors.

SUMMARY OF THE INVENTION

It is a primary object of the present invention to provide a drive control device in an ultrasonic vibration motor in which the abrasion of the resilient member and the moving member resulting from an increase in the load of the motor is prevented.

It is another object of the present invention to provide a device for detecting a variation in the load of an ultrasonic vibration motor by monitoring an AC input.

In a preferred embodiment of the present invention, the increase in said load is detected on the basis of a variation in the difference between the voltage phase and the current phase of the AC input to the motor.

In another embodiment of the present invention, the increase in said load is detected on the basis of a variation in the amplitude of the AC input voltage to the motor.

BRIEF DESCRIPTION OF THE DRAWINGS

FIGS. 1A and 1B are a plan view and a side sectional view, respectively, of an ultrasonic vibration motor.

FIG. 2 is a block diagram of a device according to a first embodiment of the present invention.

FIG. 5 is a block diagram of a modification of the first embodiment.

FIG. 6 is a block diagram of a device according to a second embodiment of the present invention.

FIG. 8 is a time chart showing the operation of the second embodiment.

FIG. 9 is a perspective view of an automatic focus adjustment camera.

DESCRIPTION OF THE PREFERRED EMBODIMENTS

Figure 3:
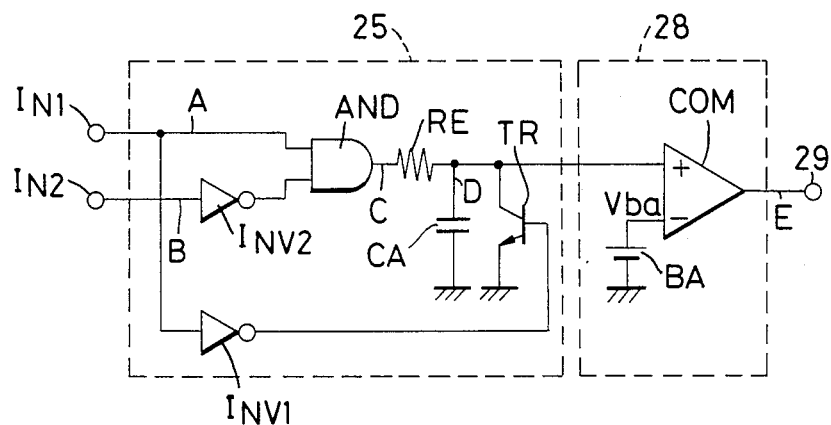
FIG. 3 is a circuit diagram of a phase difference detecting circuit/and a discriminating circuit.

A first embodiment of the present invention will hereinafter be described with reference to FIGS. 1 to 4.

An ultrasonic vibration motor 10, as shown in FIG. 1A and 1B, comprises an annular resilient member 11 and a similarly shaped moving member 12 pressed against the resilient member 11 with a predetermined pressure force by a spring member, not shown. An electrostrictive device 13 is attached to the back of the resilient member 11, and electrodes 14a-14d are formed on the surface 13a of the electrostrictive device 13. The electrostrictive device 13 underlying the electrodes 14b and 14d is polarized alternately. The construction of such motor is shown in detail in the aforementioned U.S. Pat. No. 4,510,411.

In FIG. 2, the output of an AC power source 21 is input to a phase shift circuit 22, a switch 23 subsequent to the phase shift circuit 22, a current phase detecting circuit 24 and a phase difference detecting circuit 25. The phase shift circuit 22 provides an output with the phase of the input alternating current being delayed by 90°, and the output is amplified by an amplifier 26 through the contacts b and c of the switch 23 and is applied as an AC driving voltage to the electrode 14d. The current phase detecting circuit 24 serves to detect the current phase of the input alternating current, and the output thereof is amplified by an amplifier 27 and is applied as an AC driving voltage to the electrode 14b. The phase difference detecting circuit 25 detects the phase difference between the phase of the voltage applied to the electrostrictive device 13 and the phase of the current flowing into the electrostrictive device 13. The detected phase difference is input to a discriminating circuit 28 and, when it is discriminated that the detected phase difference exceeds a predetermined value, a discrimination signal is output to a terminal 29. A latch circuit, 30 for latching the discrimination signal is connected to the terminal 29, and by the latch output thereof, the switch 23 is changed over to the contact a or b. That is, the switch 23 is changed over to the contact a side when the difference between said two phases exceeds a predetermined value, and the switch 23 is changed over to the contact b side when the phase difference is less than the predetermined value. A reset switch 31 is connected to the latch circuit 30, and the latch circuit is reset by this switch 31.

When the switch 23 is connected to the contact b side, AC voltages which are 90° out of phase with each other are applied from the AC power source 21 to the electrodes 14b and 14d, respectively, of the electrostrictive device 13 through the amplifiers 26 and 27. Therefore, a travelling vibration wave is generated in the surface of the resilient member 11 and rotatively drives the moving member 12. When the switch 23 is changed over to the contact a side, AC driving voltages of the same phase are applied to the electrostrictive device 13, so that a standing vibration wave is formed in the surface of the resilient member 11 by the electrostrictive device 13, and the frictional drive force between the resilient member 11 and the moving member 12 is reduced and the driving torque becomes null, whereby the rotation of the moving member 12 is stopped.

The details of the phase difference detecting circuit 25 and the discriminating circuit 28 are shown in FIG. 3. In FIG. 3, the phase difference detecting circuit 25 has two input terminals IN1 and IN2, and the voltage phase from the AC power source 21 and the current phase from the current phase detecting circuit 24 are input to the input terminal IN1 and IN2, respectively. The input terminal IN1 is connected to an AND gate AND and an inverter INV1, and the input terminal IN2 is connected to an inverter INV2. The AND output is connected to the non-inverting input terminal of a comparator COM through a resistor RE, while it is grounded through a capacitor CA and a transistor TR. An integrating circuit is constituted by the resistor RE and the capacitor CA. The output of the inverter INV1 is input to the base of the transistor TR. The inverting input terminal of the comparator COM is connected to a power source BA and a reference voltage designated by Vba is applied thereto.

Figure 4:
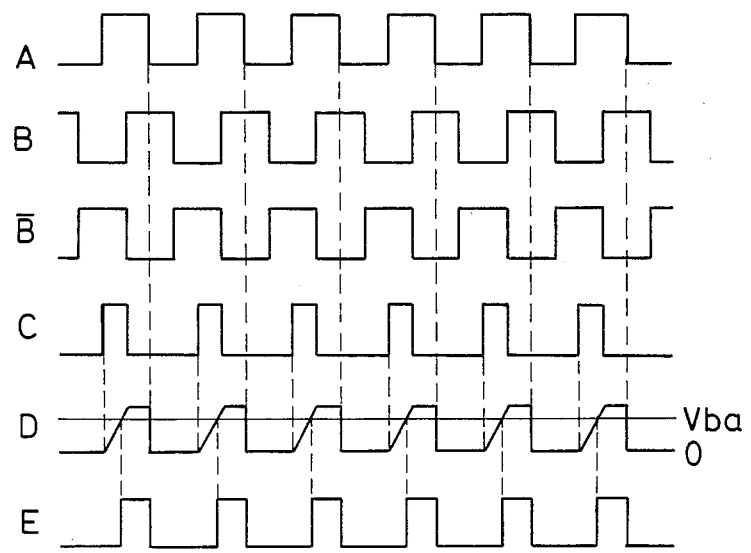
FIG. 4 is a time chart showing the operations of the circuits of FIG. 3.

Reference is now had to FIG. 4 to describe the operations of the phase difference detecting circuit 25 and the discriminating circuit 28. It is to be understood that the latch circuit 30 outputs a latch signal of low level, the switch 23 is connected to the contact b side, AC voltages which are 90° out of phase with each other are applied to the electrodes 14b and 14d, respectively, of the electrostrictive device 13, a travelling vibration wave is formed in the resilient member 11 and the moving member 12 is being rotatively driven.

A voltage phase A is input to the input terminal IN1 and a current phase B is input to the input terminal IN2. The difference between the two phases becomes greater correspondingly to the load of the ultrasonic vibration motor 10. When a load acts on the moving member 12 to cause a deviation between the two phases, the AND output C rises during the time that the voltage phase A rises and the current phase B falls. At this time, the capacitor CA is charged by the AND output C. Accordingly, the input voltage D of the non-inverting input terminal of the comparator COM becomes such as shown in FIG. 4. The reference voltage of the non-inverting input terminal of the comparator COM is now set to Vba and therefore, when the input voltage D of the non-inverting input terminal exceeds Vba, the output E of the comparator COM assumes a high level, and that output E is taken out from the terminal 29 and is latched by the latch circuit 30. Since the latch circuit 30 outputs a latch signal of high level, the switch 23 changes over to the contact a side. As a result, AC driving signals of the same phase are supplied to the electrostrictive device 13 and a standing vibration wave is formed in the resilient member 11. Therefore, the frictional drive force between the resilient member 11 and the moving member 12 is reduced, whereby the rotation of the moving member 12 is stopped and the motor 10 is stopped. If the load of the moving member 12 is liberated and the latch circuit 30 is reset by the reset switch 31, the switch 23 will change over to the contact b side and again the AC voltages which are out of phase with each other will be applied to the motor 10, which will thus be started by a travelling vibration wave.

In the foregoing description, the electrostrictive device has been described as being driven by AC voltages, whereas the electrostrictive device may be driven by any signal as long as it is a signal whose voltage fluctuates periodically, such as a pulse-like driving signal. Also, an alarm device 32 responsive to the high-level signal of the comparator may be provided to inform by an alarm lamp or an alarm sound that the load of the moving member has become great. Further, use has been made of only one comparator of the reference voltage Vba, but alternatively, a plurality of comparators differing in reference voltage may be provided so that when the load of the moving member becomes great to a first magnitude, a warning may first be given in the form of an alarm sound and thereafter, when said load has become great to a second magnitude greater than the first magnitude, a standing vibration wave may be formed to stop the moving member.

Also, the power supply line connected to the contact a of the switch 23 may be omitted, whereby the power supply to the amplifier 26 may be cut off when the latch circuit 30 operates. Furthermore, as shown in FIG. 5, a power source switch 40 adapted to be opened in response to the output of the latch circuit 30 may be provided so as to cut off all the power supply to motor in response to an increase in the load.

A description will now be given of a second embodiment which is designed so as to detect any increase in the load of the motor on the basis of a variation in the amplitude of the AC input voltage.

In FIG. 6, the output of an oscillator 51 is shifted by 90° in phase by a phase shifter 52 and supplied to an amplifier 53, and the amplified periodic voltage is supplied to the electrode 14d of the motor 10. The output of the oscillator 51 is also amplified by an amplifier 54 and supplied to the electrode 14b of the motor 10. The output of the amplifier 54 is supplied to a detecting circuit 55, which outputs a detection signal when the load of the moving member 12 is great. That output is supplied to an AND gate 56. A timer 57 is connected to one input terminal of the AND gate 56, and this timer 57 supplies a low-level signal to the AND gate 56 for a predetermined time after a motor starting command has been put out from a starting device 58. The oscillator 51 oscillates in response to the motor starting command and outputs pulses.

Figure 7:
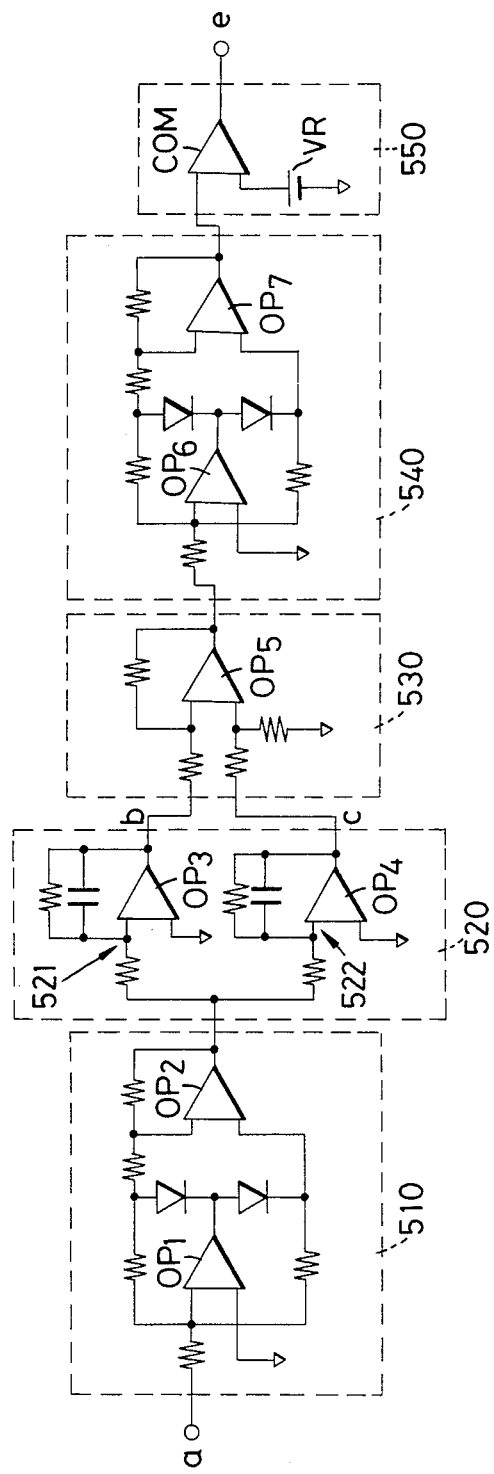
FIG. 7 is a circuit diagram of a detecting circuit.

The detecting circuit 55 will now be described in detail with reference to FIG. 7. The detecting circuit 55 comprises a rectifying circuit 510 for full-wave-rectifying the input periodical voltage a, an integrating circuit 520 comprising two integrators 521 and 522 having different time constants, a differential amplifier circuit 530 to which the outputs b and c of the integrators 521 and 522 are input and which outputs a signal d corresponding to the difference between the two inputs, a rectifying circuit 540 for full-wave-rectifying the output d, and a comparing circuit 550 for comparing the output from the rectifying circuit 540 with the output of a reference voltage source VR and outputting a detection signal e.

The operation of the present embodiment thus constructed will hereinafter be described with reference to the time chart of FIG. 8.

When a motor starting command is put out at a point of time $t_1$, the oscillator 51 starts to oscillate. The periodic voltage output from the oscillator 51 is shifted by 90° in phase by the phase shifter 52 and input to the amplifier 53, while it is directly input to the amplifier 54.

Accordingly, periodic voltages which are 90° out of phase with each other are applied to the electrodes 14b and 14d, respectively, of the electrostrictive device 13, and a travelling vibration wave is formed in the resilient member 11. As a result, the moving member 12 pressed into contact with the resilient member 11 is rotatively driven in one direction.

The periodic voltage a amplified by the amplifier 54 is full-wave-rectified by the rectifying circuit 510 of the detecting circuit 55 and is input to the integrating circuit 520. Thereby, the integrators 521 and 522 integrate the input signal and the outputs b and c thereof exhibit characteristics b and c, respectively, as shown in FIG. 8. Since the time constant of the integrator 521 is great, the rising thereof is gentle, and since the time constant of the integrator 522 is small, the rising thereof is steep. The difference between these rising characteristics is detected by the differential amplifier circuit 530, and an output d corresponding to the difference between the outputs b and c of the integrators 521 and 522 is provided from the differential amplifier circuit 530. This output d is full-wave-rectified by the rectifying circuit 540, is input to the comparing circuit 550 and is compared with a reference voltage VR.

When the motor is started, a peak d1 shown in FIG. 4 is obtained from the differential amplifier circuit 530, and if this peak value exceeds the reference voltage VR, a high-level signal e1 as shown in FIG. 8 is obtained from the comparing circuit 550. During the time at after the motor has been started, a low-level signal f is input from the timer 57 to the AND gate 56 and therefore, even if the comparing circuit 550 outputs the high-level signal e1, the output g of the AND gate 56 holds a low level. Accordingly, the great load when the motor is started is not detected.

When a great load then acts on the moving member 12 at a point of time $t_2$, the amplitude at the point of time $t_2$ and subsequent points of time becomes small relative to the amplitude at the points of time $t_1 - t_2$ in the periodic voltage a applied to the electrostrictive device 13 because the output impedance of the amplifier 54 is not zero. By this variation in the amplitude, the outputs b and c of the integrators 521 and 522 are decreased in conformity with the time constants thereof, respectively. A bottom-like waveform d2 corresponding to the difference between the integrators 521 and 522 appears as the output of the differential amplifier circuit 530. This output d2 is rectified by the rectifying circuit 540 and input to the comparing circuit 550 and therefore, if the input signal exceeds the reference voltage VR, a high-level signal e2 is output from the comparing circuit 550. The AND gate 56 is now in the enable state due to the high-level signal f from the timer 57 and accordingly, the output g of the AND gate 56 rises at a point of time $t_3$ and the load is detected.

By this high-level signal g, the oscillator 51 can be stopped or as in the aforedescribed first embodiment, a standing vibration wave can be formed in the resilient member 11. Also, the phase of the periodic voltage input to the segment electrodes 14b and 14d may be shifted so that the moving member 12 may be reversely driven.

FIG. 9 shows an automatic focus adjustment camera to which the abovedescribed embodiment is applicable. A rotary type ultrasonic vibration motor 10 is provided in a camera housing 71, and a gear 74 integral with a coupling 73 is in meshing engagement with a gear 72a at the end of the output shaft 72 of the motor. The coupling 73 is projectedly provided on the lens mount 75 of the camera housing and is engaged with the coupling, not shown, of a photo-taking lens 76. The focusing ring 77 of the photo-taking lens 76 is provided for rotation about the optic axis relative to a fixed cylinder 78, and may be rotated by the motor 10 through the coupling 73 to thereby move an optical system 79 back and forth along the optic axis. The focusing ring 77 has a restraining member 77a which is adapted to bear against the limiting portions 78a and 78b of the fixed cylinder 78 so that the focusing ring rotates only within the range from infinity to the shortest photographing distance.

When the restraining member 77a bears against the limiting portion 78a or 78b while the focusing ring 77 is being rotated by the motor 10, the load of the motor 10 increases abruptly, and this variation in the load is detected by a detecting circuit. By this detection, for example, the power supply to the motor can be cut off, or a standing travelling wave can be formed to stop the motor, or the motor can be reversed to thereby accomplish automatic focus adjustment again.

The present invention is also applicable to linear type ultrasonic vibration motors, and to various apparatuses besides cameras.

We claim:

1. An ultrasonic vibration motor comprising:
   a moving member;
   a vibration member contacted by said moving member;
   electrostrictive means provided on said vibration member;
   power supply circuit means for applying a pair of periodic voltages having a predetermined phase difference therebetween to a pair of parts of said electrostrictive means, respectively, to generate a travelling vibration wave in the surface of said vibration member;
   means for detecting a variation in the load of said moving member; and
   control means for controlling said power supply circuit means to change said phase difference between said pair of periodic voltages so as to generate a standing vibration wave in the surface of said vibration member instead of said travelling vibration wave when said detected load exceeds a reference value.

2. An ultrasonic vibration motor according to claim 1, wherein said control means eliminates said phase difference in response to said detecting means.

3. An ultrasonic vibration motor according to claim 1, wherein said predetermined phase difference is 90 degrees.

4. An ultrasonic vibration motor according to claim 1, wherein said detecting means detects said variation from a variation in an electrical characteristic of one of said pair of periodic voltages.

5. An ultrasonic vibration motor according to claim 1 wherein said detecting means includes a detection circuit connected to said power supply circuit means for detecting a phase difference between the phase of the voltage and the phase of the current of one of said pair of periodic voltages.

6. An ultrasonic vibration motor according to claim 5, wherein said detecting means further includes means for comparing the detected phase difference with a reference phase difference, and produces an output when said detected phase difference exceeds said reference phase difference.

7. An ultrasonic vibration motor according to claim 1, wherein said detecting means includes a detection circuit connected to said power supply circuit means for detecting variation in the amplitude of one of said pair of periodic voltages.

8. An ultrasonic vibration motor according to claim 7, wherein said detection circuit produces a detection output when the variation in said amplitude exceeds a predetermined amount of variation.

* * * * *